Sept. 5, 1967

H. C. MILLER 3,340,378

FIXTURE FOR RESISTANCE-BRAZING DIAMOND SAW
TEETH IN POSITION ON STEEL SAW BLADES

Filed Jan. 8, 1965

INVENTOR
HAROLD C. MILLER by: Norman F. Gerlach

ATTY.

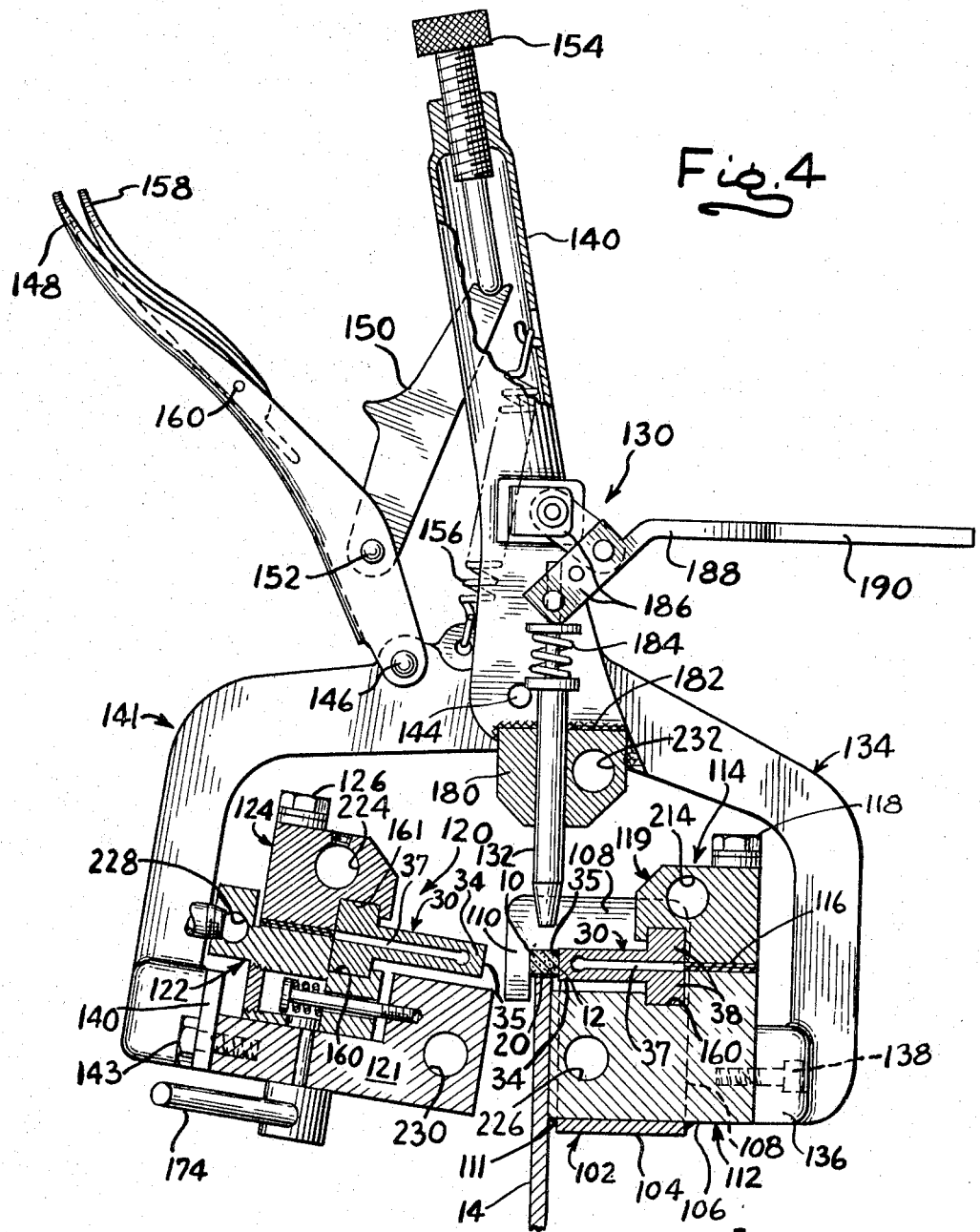

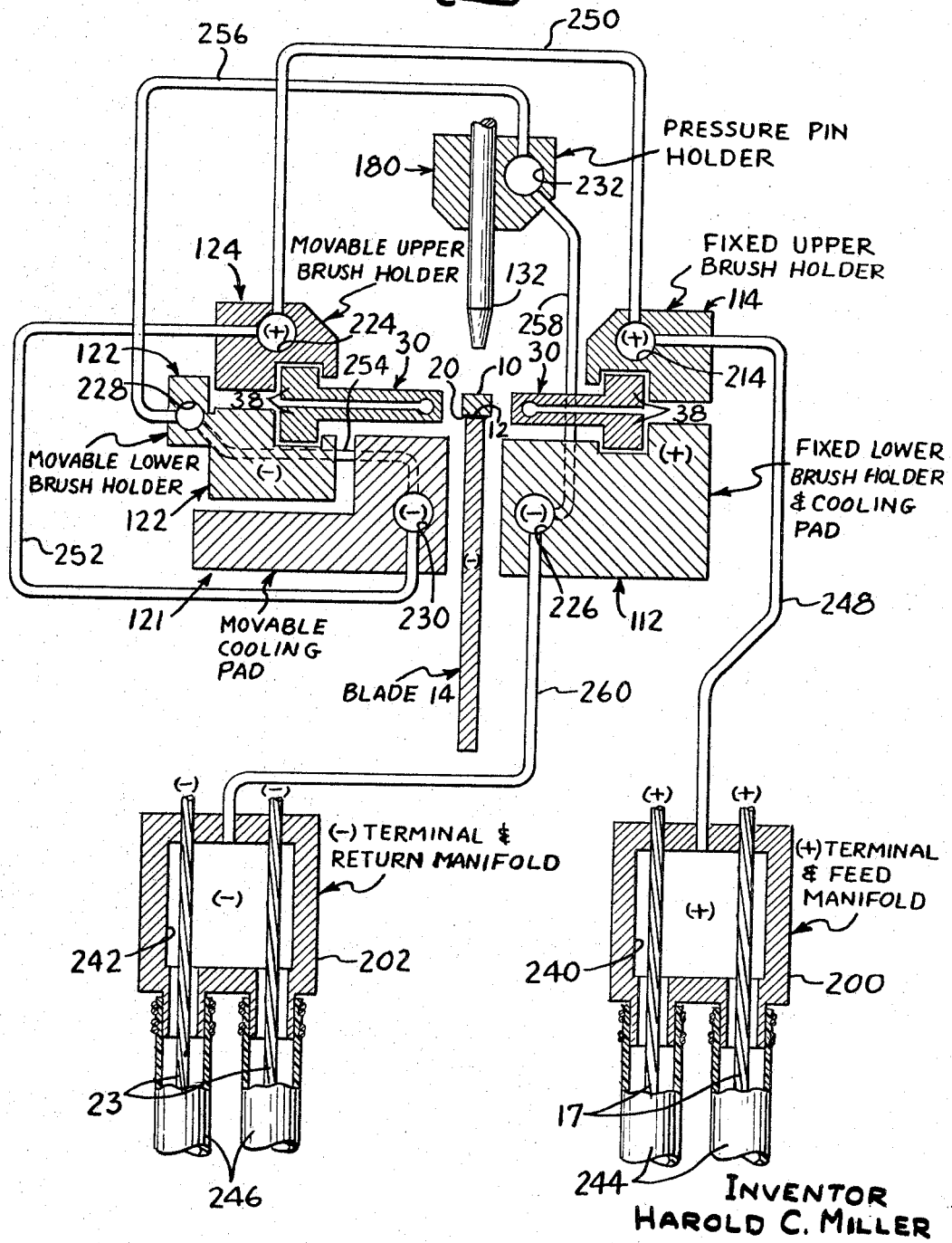

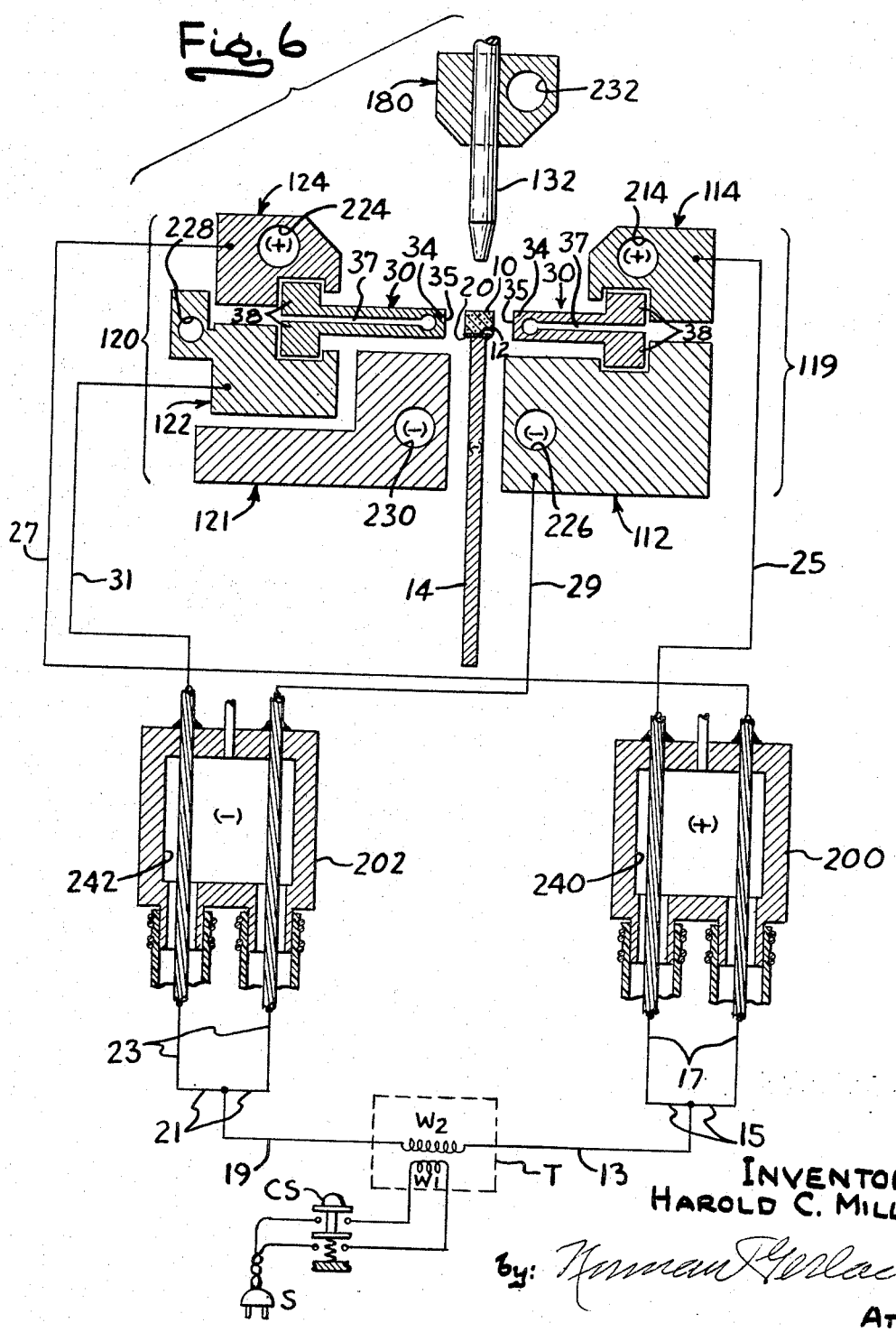

Sept. 5, 1967  H. C. MILLER  3,340,378
FIXTURE FOR RESISTANCE-BRAZING DIAMOND SAW
TEETH IN POSITION ON STEEL SAW BLADES
Filed Jan. 8, 1965  7 Sheets-Sheet 7
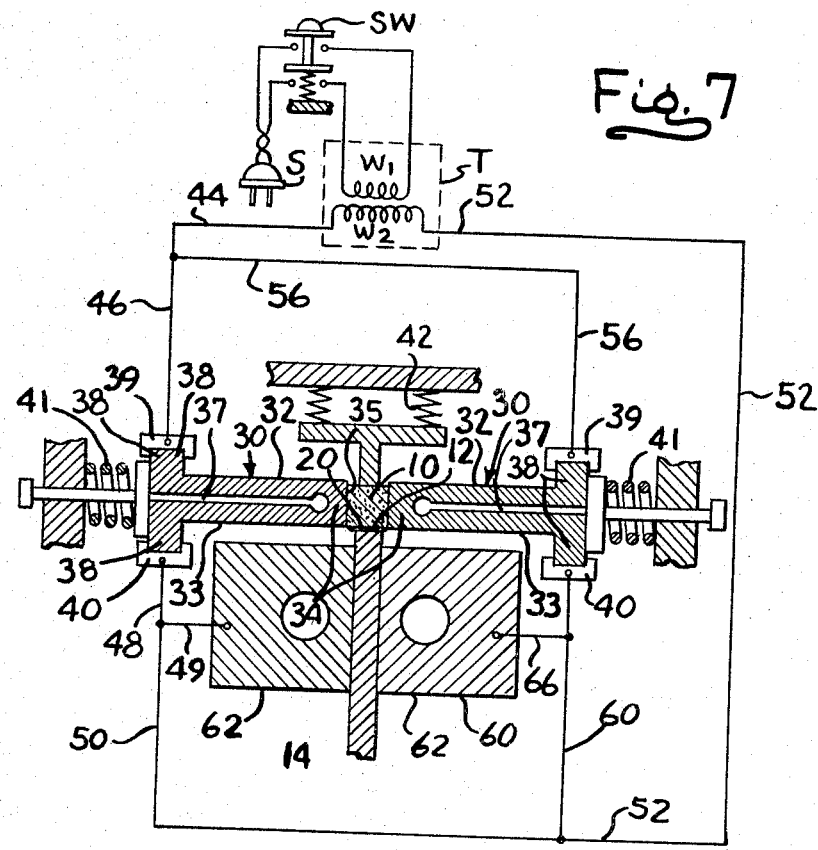
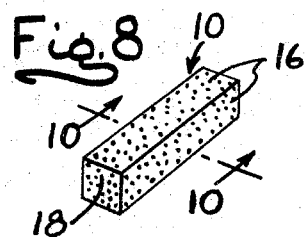
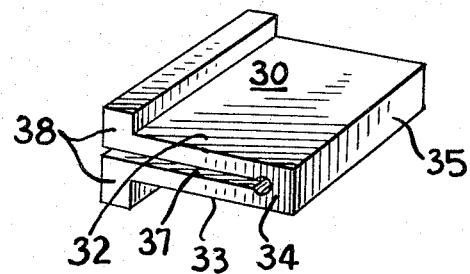
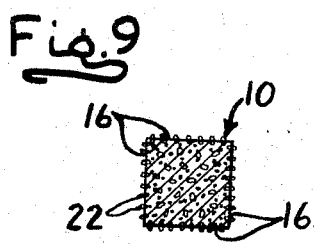
INVENTOR
HAROLD C. MILLER
by: Norman Gerlach
ATTY.

United States Patent Office 3,340,378
Patented Sept. 5, 1967

3,340,378
FIXTURE FOR RESISTANCE-BRAZING DIAMOND SAW TEETH IN POSITION ON STEEL SAW BLADES
Harold C. Miller, Chicago, Ill., assignor to Super-Cut, Inc., Chicago, Ill., a corporation of Illinois
Filed Jan. 8, 1965, Ser. No. 424,358
18 Claims. (Cl. 219—85)

ABSTRACT OF THE DISCLOSURE

An apparatus for resistance-brazing metallic saw tooth segments to the periphery of a large diameter circular disk-like saw blade. Water-cooled electrode holders on opposite sides of the saw blade carry electrodes which are pressed against the sides of a saw tooth properly positioned on the blade. The holders also carry cooling pads which are pressed against the opposite dies of the saw blade in the immediate vicinity of the brazing area in order rapidly to conduct heat therefrom and prevent saw blade buckling.

---

The present invention relates to an apparatus for attaching separately-formed diamond saw teeth to saw blades and has particular reference to a novel fixture by means of which resistance-brazing of such teeth to steel saw blades is facilitated. The fixture constituting the present invention is useable in the fabrication of rotary saws for sawing limestone, marble, granite and the like, as well as the fabrication of reciprocating or band saws for the same purpose.

In my copending United States Patent application Ser. No. 424,359, filed on Jan. 8, 1965, and entitled, "Method of Attaching Separately-Formed Diamond Saw Teeth to Steel Saw Blades," there is shown and described a novel method of resistance-brazing diamond saw teeth in position on the working edges of various types of steel saw blades. The present invention is concerned with a novel fixture by means of which the method of my copending application may, conveniently and with rapidity, be carried out.

By way of introduction to the present invention, it is pointed out that diamond saw teeth of the type with which the present invention is concerned consist of separately-formed, block-like cutting segments in the form of sintered metal matrices and crushed or fragmented diamond particles distributed substantially uniformly throughout the matrices. Prior to the invention of my copending application, it was the practice to apply diamond saw teeth or cutting segments to steel saw blades by a brazing operation involving the use of a fluxing compound and silver solder, a heat torch or an induction coil being used to melt the solder. This heats a large area of the steel blade in the vicinity of teeth application and results in warping of the blade as well as drawing the temper of the steel. In addition to this, the process is time-consuming and requires the use of highly skilled labor. Efforts to reduce the length of time required to affix a diamond saw tooth in position on the working edge of a saw blade by utilizing a resistance-brazing method instead of a torch or induction coil method had, until the advent of the invention of my copending application, not proven satisfactory due largely to the fact that difficulty is encountered in getting the current to flow through the fluxing compound which has hardened on the contacting end of the electrode after a previous brazing operation, and also due to the protrusion of non-conductive diamond particles on the surface of the block-like tooth that is to be brazed to the steel blade. If an initial conducting path obtains, then resistance-brazing will take place as soon as the welding current is turned on. Otherwise, no current will flow, no resistance heating will take place, and the silver solder will not melt.

In order to overcome these limitations that are attendant upon prior attempts to resistance-braze diamond saw teeth to the working edges of steel saw blades, the method of my aforementioned copending patent application provides for the placement of a tooth on the saw blade under pressure. Specially designed electrodes are applied to the opposite sides of the tooth and welding current is caused to flow through each electrode independently of the other electrode. This has the effect of immediately heating the two electrodes regardless of whether they make good electrical contact with the diamond saw tooth, or whether the tooth makes good electrical contact with the steel blade. The thus heated electrodees then melt any skin of hardened fluxing compound on the electrodes and conduct heat to the tooth so that the coating of silver solder will melt and establish a good conductive path for current wherever such path may be initially lacking and, as soon as such path is established, a welding current will flow in the normal manner from the electrodes, through the tooth and the blade and thus complete the brazing operation.

The assembly fixture of the present invention greatly facilitates practicing the method briefly outlined above and more particularly described in my previously mentioned copending patent application. Functionally, insofar as the method per se is concerned, it affords a convenient means whereby the desired degree of overhang of a diamond saw tooth beyond the opposite sides of the blade may be accurately gauged and the tooth securely held so that such degree of overhang remains effective during the entire brazing operation. Secondly, it makes provision for all necessary clamping operations including clamping the tooth on the blade under yielding pressure, and clamping the two electrodes against the opposite sides of the tooth under yielding pressure. It also makes provision for clamping a pair of cooling pads against the opposite sides of the steel saw blade in the vicinity of a brazing operation so that the heat that is generated by the brazing operation may not enter the blade to warp the same or destroy the temper of the steel. Still further, it makes provision for quick and facile initial application of the clamping means preparatory to effecting each brazing operation, as well as equally quick and facile release of such clamping means after each brazing operation so that the clamping fixture as a whole may conveniently be slid lengthwise along the working edge of the saw blade to a new position after each brazing operation has been completed. In connection with this latter feature of the assembly fixture of the present invention, the clamping means embodies a sliding support for the fixture whereby the fixture is hooked over or "hung," so to speak, from the working edge of the saw blade so that the entire weight of the fixture is supported by the blade. This hanging support for the assembly fixture remains effective whether the clamping means is operative or inoperative. Stated otherwise, immediately upon release of the clamping means when a given brazing operation has been completed, the assembly fixture remains slidingly supported upon the working edge of the blade so that it is not necessary for the operator to exert any lifting action on the fixture, either to remove the same from the blade or to reapply it in a new position preparatory to brazing the next diamond saw tooth on the blade. No removal of fixture parts or disassembly of the fixture is required, nor is any adjustment thereof necessary. All that is required of the operator in reapplying the assembly fixture to the blade in a new position is for him to slide the fixture longitudinally along the working edge of the saw blade to a new position a few inches removed from the old position, the bulk of the weight of the fixture remaining supported from the blade. With the assembly fixture thus in its new position, the operator manually inserts a new tooth in position on the working edge of the saw blade and then reapplies the clamping means, after which the welding current may be turned on.

Apart from its advantageous functional features of novelty as outlined above, the assembly fixture of the present invention is possessed of various physical attributes by means of which certain problems which invariably are associated with resistance-brazing operations as such, are overcome, utilizing novel structure. According to the present invention, the assembly fixture provides a novel hydraulic cooling system whereby practically all of the fixture components which are subject to resistance or other heating effects are conveniently cooled. These components which are hydraulically cooled include the aforementioned pair of cooling pads for withdrawing heat from the blade; the four electrodes or brush holders; the pressure pin holder which forces the tooth against the blade under yielding pressure; and also the relatively massive copper conductors which connect the electrodes and saw blade in the high amperage welding circuit.

The hydraulic cooling system is a closed series circuit wherein the liquid cooling medium flows successively through the various components which are to be cooled, as well as along the entire length of the copper conductors leading from the welding transformer to the assembly fixture. The series hydraulic system involved is, therefore, intimately physically associated with the high amperage electrical welding circuit since the cooling medium (water) comes into contact and exerts its cooling effect upon components which are maintained at both positive and negative potential. Despite this, since the hydraulic cooling system is essentially a closed series circuit, it is effectively a dry one, considering its external aspects; and the insulating features of the system, including the use of electrically non-conducting water jackets and the like, are such that the operator is exposed to no greater electrical hazards than is prevalent with conventional welding machines and methods, that is, direct contact with the electrodes themselves or their holders. Internal electrolysis of the cooling water presents no problem since the voltages involved are low and the flow of cooling water through the hydraulic system is sufficiently rapid that little or no decomposition of the water takes place and there is no appreciable temperature rise within the water.

Another physical attribute of the present assembly fixture resides in the compact placement of the various operative instrumentalities that are associated therewith including the electrode or brush holders, the cooling pads and the pin holder, and especially in the fact that very little relative movement between these parts is required at any time. The linear displacement that is involved in moving any of these instrumentalities from its clamping position to its position of release is but a fraction of an inch and thus it is possible to employ for establishing the necessary flow path for cooling water through the various instrumentalities which are to be cooled, water conducting jacketing and non-jacketing tubing which is of a heavy duty nature and is more or less of rigid nature since very little displacement thereof is at any time required. This tubing may, therefore, be made relatively short and it may conveniently be fitted to its associated parts and coiled, nested or otherwise caused to assume its required configuration within a small space, after which it need never be disturbed. Thus tube tangling, interference between adjacent tubing sections, and tubing failure because of frequent changes in internal stress are effectively avoided.

As previously stated, the method of my aforementioned copending patent application involves the use of a novel form of carbon brush type electrode, such electrode, per se, constituting, in part, the novelty of such method. The assembly fixture of the present invention employs such novel electrode and also employs a novel electrode or brush holder which, in combination with the electrode, constitutes a portion of the present invention. An additional feature of novelty of the present invention resides in the provision of a novel combined electrical terminal block and cooling liquid manifold by means of which long dual electrical lead-in or lead-out conductors for the purpose of reducing wire diameters of the transformer leads, are joined to short lead-in or lead-out conductors in the immediate vicinity of the assembly fixture proper while, at the same time, dual water jackets for the dual conductors are caused to communicate with single water jackets for the single conductors.

Convenience of arrangement of parts, simplicity of design, ruggedness, durability, ease of assembly and dismantlement for purposes of inspection of parts, replacement or repair thereof, ease of operation resulting in a dispensing of the necessity of employing highly skilled labor, and compactness of design and consequent portability of the assembly fixture, are further desirable features which have been borne in mind in the production and development of the present invention.

Other objects and advantages of the invention, not at this time enumerated, will readily suggest themselves as the nature of the invention is better understood.

In the accompanying seven sheets of drawings forming a part of this specification, one illustrative embodiment of the invention is shown.

In these drawings:

FIG. 1 is a side perspective view of an assembly fixture constructed in accordance with the principles of the present invention, such view showing the same operatively applied to the working edge of a saw blade for the purpose of applying a diamond saw tooth thereto, the assembly fixture being shown clamped in position on the blade but the electrodes and pressure pins being shown retracted for clearance purposes to permit insertion of a tooth in position on the saw blade;

FIG. 4 is an enlarged sectional view taken substantially along the vertical plane indicated by the line 4—4 of FIG. 1, and in the direction indicated by the arrows;

FIG. 5 is an hydraulic flow diagram of the improved assembly fixture;

FIG. 6 is an electric circuit diagram illustrating the manner in which opposite voltage potentials are applied to various electrical components that are associated with the assembly fixture;

FIG. 7 is an electric circuit diagram illustrating the electrical principles that are involved in connection with the method which is performed by the assembly fixture;

FIG. 8 is a perspective view of a diamond saw tooth;

FIG. 9 is an enlarged sectional view taken on the vertical plane indicated by the line 9—9 of FIG. 8 and in the direction of the arrows; and FIG. 10 is a perspective view of one of the electrodes.

Figure 1:
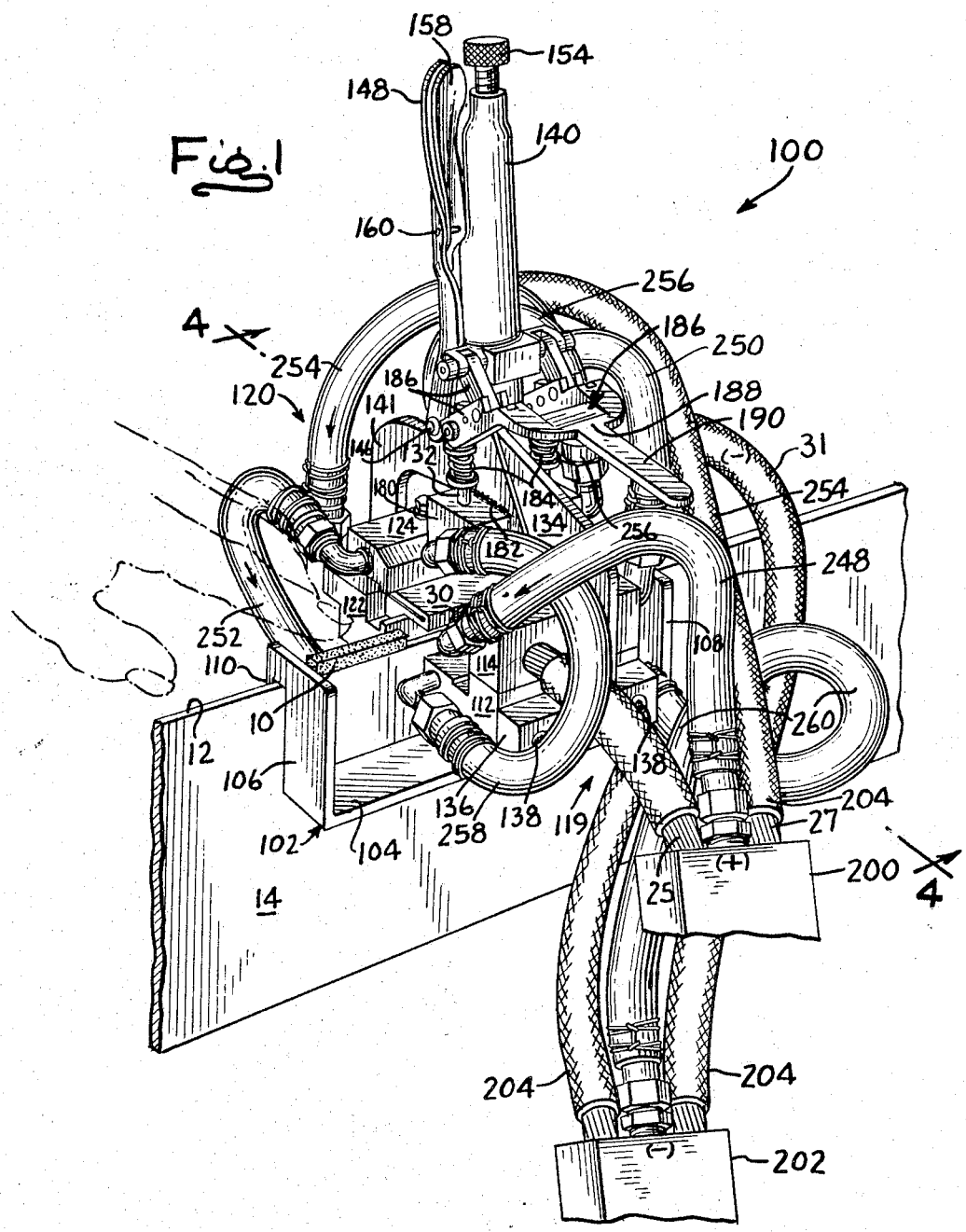

Referring now to the drawings in detail and in particular to FIGS. 6 to 9, inclusive, the assembly fixture of the present invention is designed for use in connection with the resistance brazing of a series of separately-formed, diamond saw teeth, such as the tooth which is illustrated in detail in FIGS. 8 and 9 and is designated by the reference numeral 10, to the working edge 12 of a steel or other metal saw blade. A portion of the blade is identified in the drawings by the reference numeral 14. The blade may be of circular design and the diamond saw teeth 10 may be applied to the periphery thereof in circumferentially spaced relationship to produce a rotary segmental saw of the type which is shown and described in United States Patent No. 2,990,828, granted on July 4, 1961, and entitled, "Rotary Segmental Saw With Rim Rigidifying and Silencing Means," or it may be of the reciprocating type in which the working edge thereof is of straight linear extent. Irrespective, however, of the particular shape of the saw blade 14, the essential features of the invention are at all times preserved.

The diamond saw teeth which are to be applied to the working edge 12 of the saw blade 14 are known as diamond cutting segments and one of them is illustrated in detail in FIGS. 8 and 9. The tooth 10 is in the form of a rectangular parallelepiped which is of elongated rectangular design and has four elongated rectangular side side faces 16 and substantially square end faces 18. When the tooth is operatively applied to the working edge of the saw blade 14, one of the side faces opposes the working edge 12 of the blade and is bonded thereto by silver solder such as is shown at 20. The working edge 12 of the blade 14 is in the exemplary form of blade selected herein for illustration, linearly straight and the particular tooth side face 16 which opposes it will therefore lie flush with such edge. If, however, the working edge 12 is circular, such side face will lie in tangential relationship on the working edge but, usually, the relationship of the diameter of the blade to the linear extent of the tooth 10 is such that the tangency is scarcely apparent and the silver solder 20 will fill in any gap which may occur between portions of the working edge 12 of the blade and the opposed side face 16. Physically, the diamond saw tooth 10 is in the form of a sintered metal matrix and crushed or fragmented diamonds distributed substantially uniformly throughout the matrix. As shown in FIG. 9, the diamond particles of the tooth protrude as indicated at 22, slightly beyond the planes of the various side and end faces of the tooth. Since these protruding portions are non-conductive, there is no assurance that in accordance with conventional resistance-brazing methods, in all instances, an electrode that is positioned in contact with the tooth segment will make good electrical contact with the tooth, or that the tooth will make good electrical contact with the working edge 12 of the blade 14, regardless of the amount of pressure that may be involved in forcing such parts against each other. Since conventional brazing methods invariably rely upon the flow of welding current from the electrode through the tooth to the blade for resistance heating purposes, if good electrical contact is lacking between any two adjacent parts when the welding current is applied to the electrode and the blade in the usual manner, no current will flow and the silver solder will not melt. Sometimes a percussive blow struck on the side of the blade will help to start a current flow but such an expedient is not always reliable.

The tooth brazing method which is illustrated in FIG. 7 is a commercially reliable method and the assembly fixture of the present invention has been designed particularly for the purpose of practicing such method with convenience and dispatch. It is essential to a full understanding of the present invention that such method be understood, and accordingly, reference may be had to my above mentioned copending patent application for a full description of the method. For purposes of disclosure herein, it is deemed sufficient to state that the method is predicated upon the use of a novel form of welding or brazing electrode, two such electrodes being employed and each being of the carbon brush type and designated in its entirety by the reference numeral 30. Each electrode is in the form of a carbon brush of generally U-shape cross section (see FIG. 10) and has parallel legs 32 and 33 and a short connecting bight portion 34. The outer face 35 of the bight portion is of elongated rectangular configuration and it constitutes a contact face which is designed for face-to-face electrical contact with one side face 16 of the diamond saw tooth 10. The dimensions of said outer face 35 are approximately commensurate with the length and width of the adjacent side face 16 of the tooth so that substantially coextensive contact will be made with said side face when the electrode is applied to the tooth. The depth of the slot 37 which exists between the two legs 32 and 33 is sufficiently great that proper degree of ohmic resistance will be inherent in the electrode to generate intense heat resulting in immediate heating of the electrode when welding current is applied thereto and caused to flow from the distal end of one of the two legs 32 and 33 through the bight portion 34 to the distal end of the other leg. The ohmic value of said other leg, however, must not be below such predetermined minimum that the leg will not withstand the application of full welding voltage thereto when the first leg is shunted out of the circuit as is the case in connection with the method of FIG. 7 as will be described presently. The distal or terminal ends of the two legs 32 and 33 of each electrode 30 are provided with laterally and outwardly turned enlargements 38 which are provided for the purpose of facilitating attachment of the electrode to a pair of upper and lower electrode holders, such as the holders 39 and 40. In carrying out the method of FIG. 7, the diamond saw tooth 10 is positioned on the woking edge 12 of the blade 14 as previously described and the necessary solder and fluxing compounds are applied in the usual manner to the brazing zone or area. The two electrodes 30 are then pressed against the opposed vertically extending side faces 16 so that the outer contact faces 35 of the bight portions of the electrodes contact these side faces, suitable spring-actuated pressure means, such as is indicated by the reference numeral 41, being employed for attaining the necessary degree of yielding pressure. Additional pressure means 42 is employed for yieldingly pressing the tooth 10 downwardly against the working edge 12 of the blade 14, this latter pressure means being of an insulating character or nature.

When the electrodes 30 and the pressure means 41 and 42 are in position as described above, upon closure of the operating switch SW, welding current will flow from the secondary winding W2 of the welding transformer T through both of the electrodes 30. The circuit for one of the electrodes 30 extends from the winding W2, through a pair of conductors 44 and 46, the upper brush holder 39, said one electrode 30 (including both legs 32 and 33 and the bight portion 34), the lower brush holder 40, conductors 48, 50 and 52, and back to the secondary winding W2 of the transformer T. The circuit for the other electrode 30 extends from the secondary winding W2, through the conductor 44, a conductor 56, the upper brush holder 39, both legs 32 and 33 and the bight portion 34 of said other electrode 30, the lower brush holder 40, a conductor 60, the conduit 52, and back to the secondary winding W2 of the transformer. The flow of welding current through both electrodes 30 in the manner just indicated will cause immediate heating of the two electrodes 30 to a moderate degree of incandescence but sufficient to melt any hardened residual fluxing compound on the electrodes, as well as cause heating of the tooth to a degree sufficient to cause melting of the silver solder 20. Even if poor electrical contact, or no electrical contact whatsoever obtains between the electrodes 30 and the tooth 10, or between the tooth and the steel blade 14, the parallel circuits extending through the long resistance paths that are provided by these segments will be established and both electrodes will become heated. As soon as the hardened fluxing compound and the silver solder 20 have become melted, good electrical contact between both electrodes and the tooth 10, and also good contact between the tooth and the blade will be established. At this time, and without any attention, whatsoever, on the part of the operator, a second circuit will be established through each electrode 30. In the case of one of the electrodes 30, the second circuit will extend from the secondary winding W2, through conductors 44 and 46, the upper brush holder 39, the leg 32 of the one electrode, the tooth 10, the blade 14, one of two water cooled contact pads 62 that are disposed on opposite sides of the blade 14 and bear inwardly thereagainst, a conductor 49, the conductors 50 and 52, and back to the secondary winding W2 of the transformer. The second circuit for the other electrode will extend from the secondary winding W2, through the conductors 44 and 56, the upper brush holder 39, the leg 32 of the other electrode 36, the tooth 10, the blade 14, the other water cooled contact pad 62, a conductor 66, the conductor 52, and back to the secondary winding W2 of the transformer. The two parallel circuits just described, in effect, establish a shunt circuit for the original parallel resistance circuits.

Because the resistance path through the leg 32 of each electrode 30 is now only approximately one-half of its former ohmic value when both legs of the electrodes were involved, intense heating of the current-carrying leg of each electrode will take place, thus further heating the tooth 10 for brazing purposes. Upon opening of the switch SW and cooling of the tooth 10, the brazing operation is complete. Rapid cooling of the parts is enhanced by the provision of the cooling pads 62 so that the cooling time is materially reduced.

Figure 2:
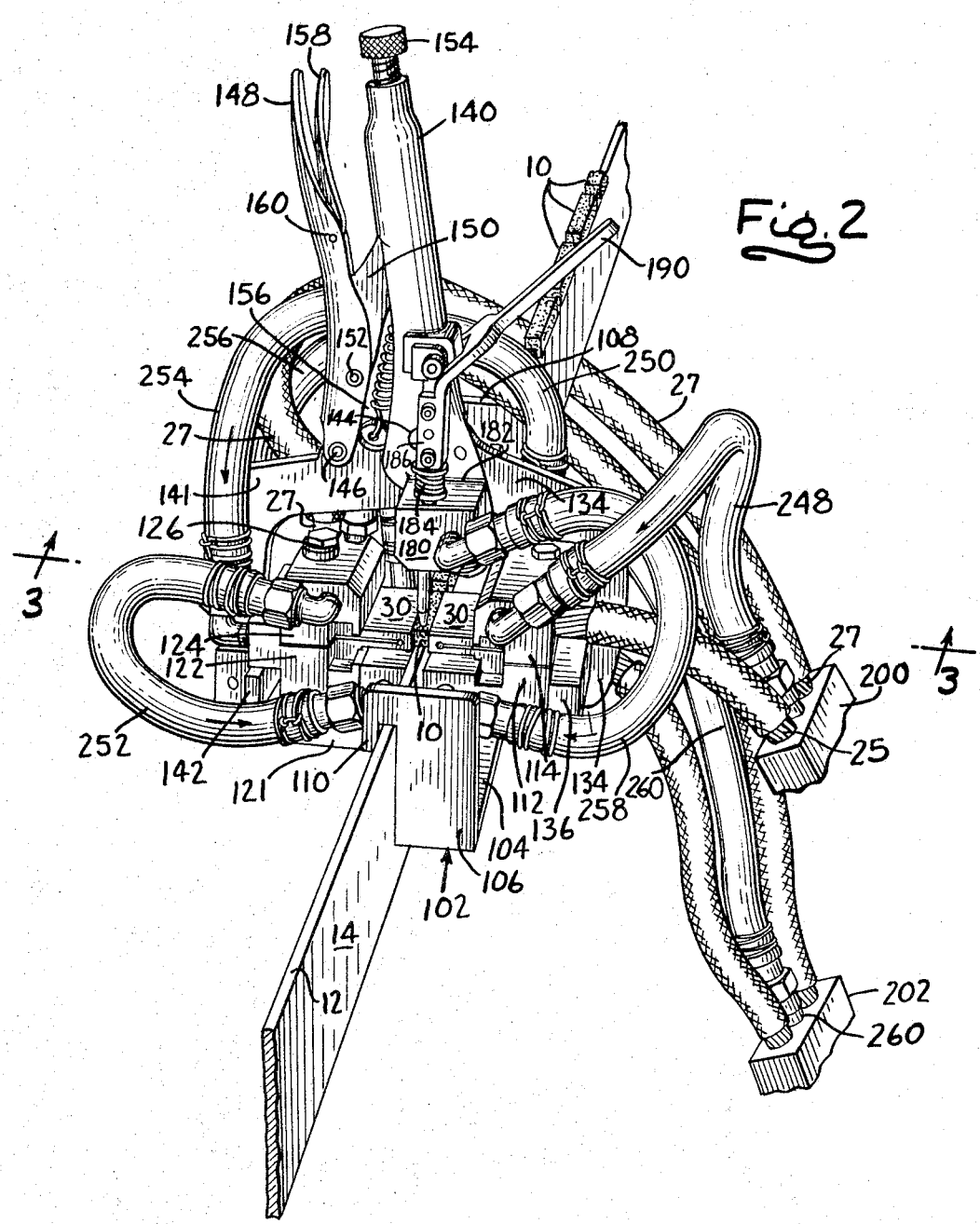
FIG. 2 is an end perspective view of the structure shown in FIG. 1, but showing the diamond saw tooth in its installed position and the various parts operating of the fixture in the positions which they assume during the brazing operation.
Figure 3:
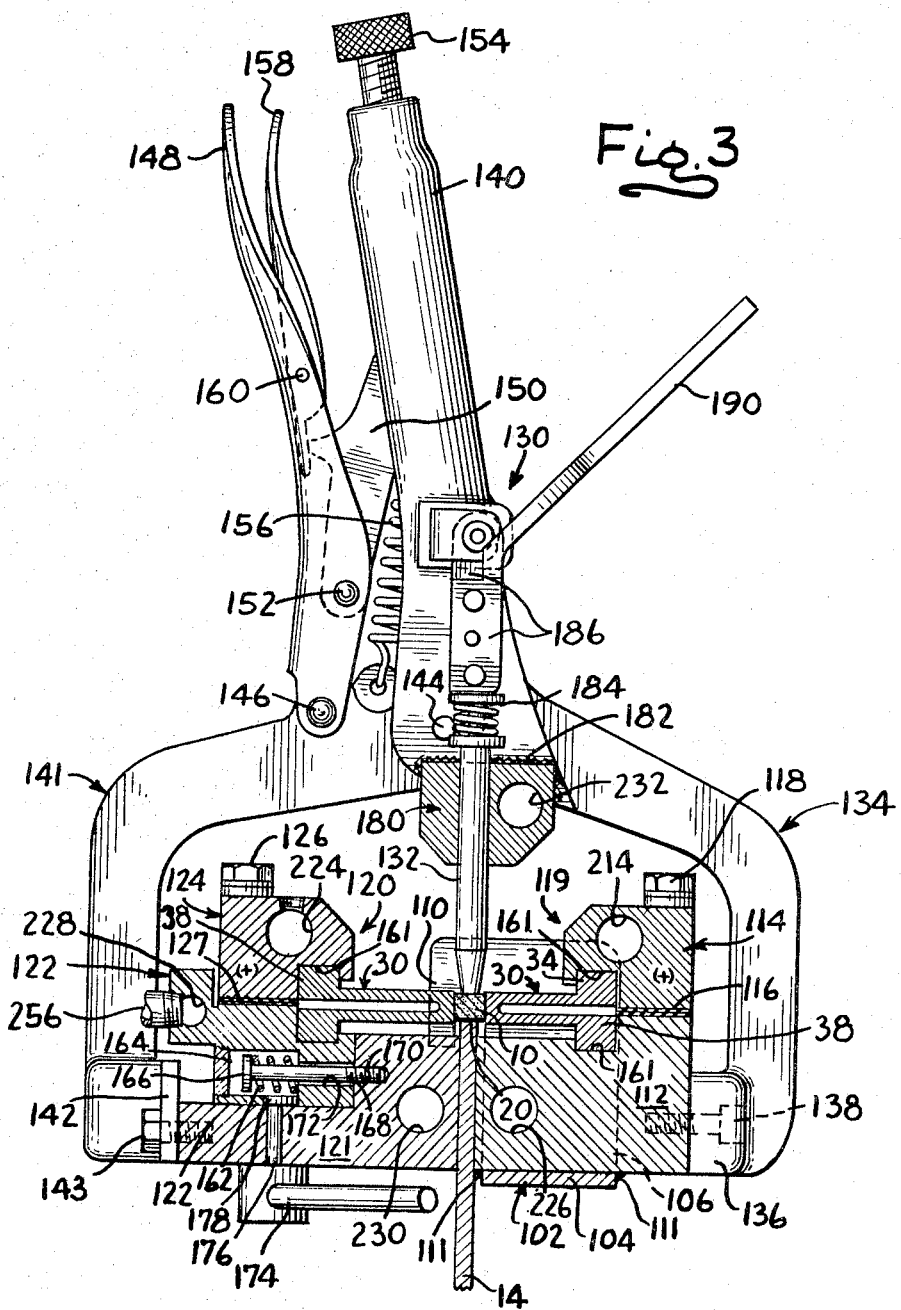
FIG. 3 is an enlarged sectional view taken substantially along the vertical plane indicated by the line 3—3 of FIG. 2, and in the direction indicated by the arrows.

Referring now to FIGS. 1 to 3, inclusive, the assembly fixture which comprises the present invention is designated in its entirety by the reference numeral 100. It has been designed specifically for the commercial application of the aforementioned method of my heretofore mentioned copending patent application and briefly described above. This assembly fixture involves in its general organization a suspension bracket 102 which is in the form of a hanging cradle having a horizontal cradle bottom 104 and upstanding cradle ends 106 and 108. The latter have on the upper ends thereof integral hook portions 110 by means of which the cradle may be hung from the working edge 12 of the saw blade 14. When operatively installed on the blade 14, the cradle assumes a fixed or stationary position alongside the blade with the cradle bottom 104 and ends 106 bearing edgewise against the adjacent side of the saw blade 14 as best seen in FIGS. 1 and 2. All of the operative fixture instrumentalities are either directly or indirectly supported from the cradle and consequently from the saw blade when the cradle is in its supported position on the blade.

Fixedly secured to the cradle bottom 106 in any suitable manner, such, for example, as by welding as indicated at 111 in FIG. 3, is a combined cooling pad and lower electrode holder 112. Fixedly secured to the combined pad and holder 112 is an upper electrode holder 114, the latter being insulated from the combined pad and holder 112 by an insulating separator sheet 116 and being secured in position on said cooling pad and lower electrode holder 112 by insulated clamping bolts 118. The combined cooling pad and lower electrode holder 112 and the upper electrode holder 114 constitute a fixed assembly 119 of parts on the right hand side of the blade 14 as viewed in FIGS. 1 to 4, inclusive. This fixed assembly of parts is opposed on the other side of the blade 14 by a movable assembly 120 of parts, the last mentioned assembly including a cooling pad 121, a lower electrode holder 122, and an upper electrode holder 124. The upper electrode holder 124 is secured to the lower electrode holder 122 by an insulated clamping bolt 126 which is similar in design and function to the clamping bolt 118. The upper electrode holder 124 is also insulated from the lower electrode holder 122 by an insulating separator sheet 127 which is similar in design and function to the separator sheet 116. The upper and lower electrode holders 124 and 122 of the movable assembly 120 are slidable bodily as a unit on the cooling pad 121 toward and away from the blade 14 for electrode manipulating purposes in a manner that will be made clear presently. The entire movable assembly 120 of parts is movable bodily as a unit toward and away from the blade 14 between the clamping position in which it is shown in full lines in FIG. 4 and the position of release wherein it is shown in dotted lines.

The movable assembly 120 is operatively supported from the fixed assembly 119 by means of a self-locking vice assembly 130 which operates upon well known toggle principles and has associated therewith a supplementary toggle mechanism for supporting and actuating a pair of pressure pins 132. The latter are employed for the purpose of yieldingly applying pressure to the solder-equipped tooth 20 in order to maintain the same seated under pressure upon the working edge 12 of the blade 14 during the brazing operation.

The vice assembly 130 (see FIG. 4) includes a fixed, depending vice jaw 134 which carries at its lower end a jaw pad 136. The latter is secured by screws 138 to the combined cooling pad and lower electrode holder 112. The upper end of the fixed vice jaw 134 is provided with a fixed upstanding tubular gripping handle 140. The vice assembly 130 further includes a movable depending vice jaw 141 having at its lower end a jaw pad 142 which is secured by screws 143 to the cooling pad 121. The upper portion of the movable vice jaw is pivoted at 144 to the upper portion of the fixed vice jaw 134. The upper end of the movable vice jaw 141 has pivoted thereto as at 146 a movable gripping handle 148. An upstanding toggle thrust link 150 has its lower end pivoted at 152 to the upper portion of the movable vice jaw 141; and the upper or distal end of this link finds reaction support at the lower end of a substantially vertical adjusting screw 154 which is threadedly received in the upper end of the tubular gripping handle 140 of fixed vice jaw 134. A spiral tension spring 156 has its opposite ends anchored to the gripping handle 140 of the fixed vice jaw 134 and the upper portion of the movable vice jaw 141 and normally biases the two vice jaws toward the open position wherein they are illustrated in dotted lines in FIG. 4. Upon "squeezing" of the two gripping handles 140 and 148, the toggle thrust link 150 moves to an over-center position and causes the movable jaw 141 to swing downwardly and inwardly to the full line position of FIG. 4 wherein the two cooling pads 121 and 112 are drawn into clamping engagement with the opposite sides of the steel blade 14. A conventional upstanding release lever 158 is medially pivoted by a pin 160 to the movable gripping handle 148 and cooperates by a camming action with the toggle link 150 to release the vice jaws 134 and 141 initially from their gripping position by the application of initial torque to the movable gripping handle 148.

It has previously been set forth how, in connection with the resistance-brazing method that is accomplished by the present assembly fixture 100, two carbon brush type electrodes 30 are applied to the opposed vertically extending side faces 16 of the diamond saw tooth 10 when the latter is seated upon the working edge 12 of the blade 14. The manner in which these electrodes are mounted in the assembly fixture 100 is best illustrated in FIGS. 3 and 4 wherein the outwardly turned enlargements 38 on the free ends of the legs of the electrodes 30 are shown as being seated snugly within respective grooves 160 in the associated electrode holders. The grooves 160 in the upper and lower electrode holders 114 and 112 which are disposed on one side of the blade 14 and are associated with the fixed assembly 119 oppose each other. Similarly, the grooves 160 in the upper and lower electrode holders 124 and 122 which are disposed on the other side of the blade 14 and are associated with the movable assembly 120 oppose each other. As will be described in greater detail presently, means are provided for applying voltages of opposite potential to each pair of upper and lower electrode holders and, since the upper holders are insulated electrically from the lower holders, these voltages are applied to what may be considered the outer ends of the two electrodes 30 for initial resistance heating purposes as previously set forth.

When the vice jaws 134 and 141 of the self-locking vice assembly 130 are in their closed or gripping position, the two electrodes 30 are yieldingly clamped against the opposed vertically extending side faces 16 of the diamond saw tooth 10 under the influence of spring pressure which is exerted by a horizontally disposed spiral compressional spring 162. The latter (see FIG. 3) is disposed within a recess 164 in the lower electrode holder 122 of the movable assembly 120 and has one end thereof in abutment with the enlarged head 166 of a horizontally disposed tension bolt 168. The latter extends at right angles to the saw blade 14 and has the head 166 located at its outer end. The inner end of the bolt 168 is threadedly received in a socket 170 in the cooling pad 121, and the shank of the bolt passes loosely through a horizontal bore 172 in the lower electrode holder 122. The other or outer end of the spring 162 bears against the inner end wall of the recess 164 with the result that the spring normally urges the lower electrode holder 122 and, consequently, its associated electrode 30, to the right as viewed in FIG. 3 to the end that said associated electrode 30 engages the tooth 20 under pressure and results in the tooth being clamped between the two electrodes. The electrode 30 which is on the other side of the blade 14 and is associated with the fixed assembly 119 of parts is a fixed electrode and, when the cradle 102 is hung in position on the blade 14, the position of the contact face 35 of its bight portion with respect to the working edge 12 of the blade 14 determines the extent of overhang of the tooth on said working edge.

Outward shifting of the electrode 30 of the movable assembly 120 on the left hand side of the blade 14 as viewed in FIGS. 3 and 4 for purposes of facilitating placement of the tooth 10 on the working edge 112 of the blade 14 is effected by manipulation of a horizontal torque-applying handle 174 on the lower end of a vertical shaft 176 which projects upwardly through the cooling pad 121 and into the aforementioned recess 164. The upper end of the shaft 176 is provided with an eccentric head 178 which is adapted when the handle 174 is swung in one direction to engage the inner end wall of the recess 164 and cause the lower brush holder 122 to shift to the left as viewed in FIG. 3, such shift being against the action of the spiral compression spring 162. Such outward shifting or retraction of the left hand electrode 30 for facilitating placement of the tooth on the working edge 12 of the blade 14 may be accomplished without releasing the clamping action of the two vice jaws 134 and 141 of the self-locking vice assembly 130. The retracted position of the left hand electrode and its associated parts is shown in FIG. 4. When the handle 174 is turned in the opposite direction, the left hand electrode and its associated parts are released and shift bodily inwards in response to the action of the spring 162.

In order to apply downward pressure upon the tooth 10 and cause the same to seat squarely on the working edge 12 of the blade 14, the previously mentioned pair of pressure pins 132 is provided. These pins are vertically slidable in a pin holder 180 which is fixedly secured as by welding at 182 to the upper region or portion of the fixed vice jaw 134. The pressure pins 132 are normally yieldingly urged downwardly by spiral compression springs 184 and the upper ends of the pins are connected by toggle joints 186 to the fixed upstanding gripping handle 140 of the fixed vice jaw 134. The toggle joints are in associated relation with a pivot support yoke which has a manipulating toggle-release handle 190 for pin-actuating purposes. When the handle 190 is moved to the position in which it is shown in FIGS. 1 and 4, the toggle joints 186 are actuated in such a manner that downward pressure is exerted upon the pins 132 and the latter yieldingly urge the diamond saw tooth 10 against the working edge 12 of the blade 14. When the handle 190 is moved to the position in which it is shown in FIGS. 2 and 3, the toggle joints 186 are actuated in such a manner that the pressure pins 132 become elevated and release the tooth 10.

Referring now to FIGS. 1 to 3, inclusive, and to the electric circuit diagram of FIG. 6, the four electrode holders, i.e., the two upper electrode holders 114 and 124 and the two lower electrode holders 112 and 122, are provided with internal chambers therein by means of which they are water cooled. In addition, they are operatively connected in a welding circuit by means of heavy duty, high amperage, low voltage, current-carrying conductors which, themselves, are water cooled, all in a manner that will be described presently.

Welding current is supplied from the secondary winding W2 of the welding transformer T (see FIG. 6) to a pair of combined electric terminal and water manifold blocks 200 and 202 (see also FIGS. 1 to 3, inclusive). Upon closure of the control switch CS, current is supplied to the block 200 from the winding W2, through a lead 13, a common lead 15 and dual water cooled leads 17. Similarly, current is supplied to the block 202 through a lead 19, a common lead 21 and dual water cooled leads 23. Although the blocks 200 are energized with alternating current, for descriptive purposes the block 200 may be regarded as having a positive potential and the block 202 as having a negative potential. From the block 200, current is supplied to the upper electrode holder 114 of the fixed right hand assembly 119 through a heavily insulated lead 25. Similarly, current is supplied from the block 200 to the upper electrode holder 124 of the movable left hand assembly 120 through a heavily insulated lead 27. Two heavily insulated leads 29 and 31 serve, respectively, to supply current from the block 202 to the lower electrode holders 112 and 122. Physically, the various electrical leads 25, 27, 29 and 31 are in the form of relatively massive conductors, each of which is covered with a thick insulating jacket 204 as shown in FIGS. 1, 2 and 3. In order readily to distinguish these electrical leads from certain water-conducting tubes which appear in FIGS. 1 to 3, inclusive, the insulating jackets 204 therefor are shown as being braided.

Referring now to FIGS. 3 and 4, in conjunction with the hydraulic circuit diagram of FIG. 5, the two upper electrode holders 114 and 124 are provided with internal cooling chambers 214 and 224, respectively. The two lower electrode holders 112 and 122 are similarly provided with internal cooling chambers 226 and 228, respectively. The movable cooling pad 121 is provided with an internal cooling chamber 230; and the pin holder 180 is provided with an internal cooling chamber 232. Means are provided for passing cooling water from the combined electrical terminal and water manifold block 200, through the internal cooling chambers of the fixed upper electrode holder 114, the movable upper electrode holder 124, the movable cooling pad 121, the movable lower electrode holder 122, the pressure pin holder 180, and the fixed combined lower cooling pad and electrode holder 112, serially and in the order named, back to the terminal and return manifold block 202. Accordingly, the combined electrical terminal and water manifold blocks 200 and 202 are provided with internal chambers 240 and 242, respectively. The chamber 240 is supplied with cooling water through two flexible tubular sheathes 244 which surround the dual leads 17 and are sealed at their ends to the block 200. The chamber 242 returns cooling water through two flexible sheathes 246 which surround the dual leads 23 and are sealed at their ends to the block 202. A single flexible tube 248 connects the chamber 240 in the block 200 with the chamber 214 in the fixed upper electrode holder 114. A single flexible tube 250 connects the chamber 240 with the chamber 224 in the movable upper electrode holder 124. The chamber 224 is connected by a flexible tube 252 to the chamber 230 in the movable cooling pad 121. The chamber 230 is connected by a flexible tube 254 to the chamber 228 in the movable lower electrode holder 122. The chamber 228 is connected by a flexible tube 256 to the chamber 232 in the pressure pin holder 160. The chamber 232 is connected by a flexible tube 258 to the chamber 226 in the fixed combined lower cooling pad and brush holder 112. Finally, a flexible tube 260 connects the chamber 226 to the chamber 242 in the combined electric terminal and water manifold block 202.

In the operation of the herein described assembly fixture 100, the cradle 102 is hooked over the working edge 12 of the steel saw blade 14 as previously described so as to bring the inside face of the combined cooling pad and lower electrode holder 112 into face-to-face contact with the right hand side of the saw blade 14 as viewed in FIG. 4. The two vice jaws 134 and 141 of the vice assembly 130 will then straddle the blade 14 and the movable assembly 120 will assume the dotted line position of FIG. 4. In response to actuating or squeezing the gripping handles 140 and 148 together, the entire movable assembly will be drawn toward the blade 14, thus causing clamping of the inner face of the cooling pad 121 against the left hand side of the blade 14 and resulting in the parts assuming the full line position of FIG. 4. The toggle thrust link 150 will at the end of the handle-squeezing operation pass over its dead-center position and cause the parts to become locked in position. It will be understood, of course, that the adjusting screw 154 will be manipulated so that it will be pre-set to the proper depth for efficient clamping action when the toggle link 150 passes over its dead-center position. Once adjusted, the adjusting screw 154 will seldom be disturbed except to accommodate saw blades of varying thickness.

Assuming that the torque-applying handle 174 is in such position that the lower movable electrode holder 122 is in its retracted position and that the toggle-release handle 190 is in its lowered position, the two electrodes 30 will be separated a sufficient distance as to admit one of the diamond saw teeth 10 therebetween, while the pressure pins 132 will assume an out-of-the-way elevated position. Then, as shown in FIG. 1, the operator will position a solder-equipped tooth loosely on the working edge 12 of the blade 14 and slide the same inwardly of the self-locking vice assembly 130 and between the two electrodes 30 so that the tooth is straddled by the electrodes and underlies the two pressure pins 132. The distance between the opposed faces 35 of the two electrodes, while sufficiently great as to admit the tooth 30, is not so great that the tooth may fall from its support upon the working edge 12, and the tooth may be left loosely in position while the torque-applying handle 174 is actuated to allow the electrode holders 122 and 124 to move bodily as a unit toward the blade 14 under the influence of the spring 162 and cause the left hand electrode 30 to force or clamp the tooth 40 against the right hand electrode. The position of the fixed right hand electrode gauges the amount of overhang of the tooth on opposite sides of the working edge 12 of the blade 14 as previously described.

With the diamond saw tooth 10 now securely clamped between the two opposed electrodes 30, the toggle-release handle 190 is moved to its raised position as shown in FIG. 3 in order to cause the two pressure pins 132 to slide downwards into pressing contact with the top side face 16 of the tooth and thus cause the tooth to be firmly but yieldingly pressed against the working edge 12.

The manner in which welding current is initially applied to the opposite ends of each of two electrodes 30 for initial resistance heating of these electrodes independently of any current path or lack of a current path through the tooth 10 and the blade 14 has been set forth in detail previously in connection with the description of the circuit diagram of FIG. 7 and thus needs be but briefly reviewed at this time. Utilizing the circuit diagram of FIG. 6 instead of the diagram of FIG. 7, when the assembly fixture 100 is employed for practicing the brazing method under consideration, actuation of the switch CS will cause current to flow from the secondary winding W2 of the transformer T through leads 13, 15 and 17 to energize the block 200, and through leads 19, 21 and 23 to energize the block 202. If the protrusions 22 of diamond particles (see FIG. 9) beyond the various side faces of the tooth 10 are such that the tooth 10 fails to make good electrical contact with the working edge 12 of the blade 14, or if the presence of hardening fluxing compound precludes either or both of the electrodes from making good contact with the tooth 10, then welding current will flow from the block 200 through whichever electrode is thus insulated from the blade 14. If it is the fixed right hand electrode 30 which fails to make contact with the blade, the local heating circuit through the electrode will extend from the terminal block 200 through the lead 25, the upper electrode holder 114, said right hand electrode, the lower electrode holder 112, and the lead 29 to the block 202. If it is the movable left hand electrode 30, the local heating circuit will extend from the block 200, through the lead 27, the upper movable electrode holder 124, said left hand electrode, the lower movable electrode holder 122, and the lead 31 to the block 202.

Energization of either local circuit described above will cause resistance-heating of the associated electrode 30, the entire electrode including the two legs 32 and 33 (see FIG. 7) and the bight portion 34 becoming heated. Heating of the electrode will take place rapidly and the electrode will assume a condition of incandescence so as to melt any hardened residual fluxing compound and conduct heat to the tooth 10 which upon becoming heated will cause the silver solder to melt, whereupon good electrical contact will be attained between all of the parts involved due to the yielding pressure of the electrodes 30 against the tooth 10 and of the tooth against the working edge 12 of the blade 14. As soon as such electrical contact has been attained, the local circuit or circuits through one electrode or both electrodes will be overridden by the existence of shunt circuits passing from the bight portions of the electrodes directly into the diamond saw tooth 10. The shunt circuits for the fixed right hand electrode 30 extends from the block 200 (see FIG. 6) through the lead 25, the upper movable electrode holder 114, one-half of said right hand electrode 30, the tooth 10, the blade 14, the combined cooling pad and lower electrode holder 112, and the lead 29 to the terminal block 202. The shunt circuit for the other electrode extends from the block 200, through the lead 27, the movable upper electrode holder 124, one-half of the left hand electrode 30, the blade 14, the cooling pad 121, the movable lower electrode holder 122 and the lead 31 to the terminal block 202. Since the resistance path that is provided by either electrode 30 in the case of the aforementioned shunt circuit is approximately one-half the ohmic value of the resistance path that is offered by the electrode in the case of the initial electrode-heating circuit, intense heating of the energized half of the electrode will take place and, as a result, the resistance-brazing operation will take place rapidly.

Upon discontinuing the flow of welding current through the two shunt circuits, the various clamped parts are allowed to stand for a few moments in order to effect or allow the cooling pads 112 and 121 to conduct heat from the blade 14 as well as to allow the various chambers 214, 224, 226, 228, 230 and 232 to become effective to cool the associated electrode holders and the pin holder 180. Thereafter, the gripping handles 140, 148 are actuated to open the vice jaws 134 and 141 of the vice assembly 130 and the toggle-release handle 190 is manipulated to raise the pressure pins 132, after which the entire assembly fixture 100 may be slid lengthwise of the working edge 12 of the blade 14 to a new position for re-sistance-brazing of another diamond saw tooth 10 in position on the working edge.

It is to be noted that in moving the assembly fixture

100 to its new position, there is no need to remove the fixture from its supported position on the blade. The hook portions 110 of the cradle 102 will slide on the working edge 12 to permit longitudinal shifting of the assembly fixture bodily as a whole without danger of the fixture losing its support on the blade 14.

The invention is not to be limited to the exact arrangement of parts shown in the accompanying drawings or described in this specification as various changes in the details of construction may be resorted to without departing from the spirit or scope of the invention. For example, while a specific serial arrangement of the internal chambers within the various electrode holders and the pressure pin holder has been selected for flow of the cooling water in the hydraulic system, the various flexible water-conducting tubes may be connected in different arrangements to vary the sequential flow of water through the chambers. The toggle joints that are associated with the jaw clamping and pressure pin applying devices may find alternatives in equivalent locking cam or screw devices if desired. Therefore, only insofar as the invention has particularly been pointed out in the accompanying claims is the same to be limited.

Having thus described the invention what I claim as new and desire to secure by Letters Patent is:

1. A fixture adapted to resistance-braze an initially separate saw tooth to the working edge of a saw blade and comprising:
   (a) a pair of clamping jaws adapted to straddle the opposite sides of the blade and movable relatively to each other toward and away from said blade,
   (b) a conductive cooling pad carried by each jaw and movable bodily therewith into and out of clamping engagement with the opposite sides of the blade,
   (c) a pair of electrode holders mounted on each cooling pad, movable bodily therewith and including a lower electrode holder in electric connection with the cooling pads, and an upper electrode holder in insulated relation with the lower holder,
   (d) an elongated U-shaped carbon brush type electrode carried by each pair of electrode holders and having parallel legs in electrical connection with the upper and lower electrode holders respectively, and an interconnecting bight portion designed for clamping engagement with a tooth operatively positioned on said working edge of the saw blade,
   (e) said jaws being movable between innermost positions wherein they cause the bight portions of the electrodes to engage the opposite sides of the tooth positioned on said working edge and outer positions wherein the tooth is released by said bight portions,
   (f) means for connecting the two electrode holders of each pair in a resistance circuit, and
   (g) means for connecting the upper electrode holders and cooling pads in a welding circuit.

2. A fixture as set forth in claim 1, wherein the upper electrode holders of each pair and the cooling pads are provided with respective internal cooling chambers and including, additionally, means for passing a cooling liquid serially through said chambers.

3. A fixture as set forth in claim 1, wherein the lower electrode holders of each pair and the cooling pads are provided with respective internal cooling chambers and including, additionally, means for passing a cooling liquid serially through said chambers.

4. A fixture as set forth in claim 1, wherein the upper and lower electrode holders of each pair and the cooling pads are provided with respective internal cooling chambers and including, additionally, means for passing a cooling liquid serially through said chambers.

5. A fixture as set forth in claim 4 and including additionally, releasable toggle means for positively locking said jaws in their innermost positions.

6. A fixture adapted to resistance-brazing an initially separate saw tooth to the working edge of a saw blade and comprising:
   (a) a pair of clamping jaws adapted to straddle the opposite sides of the blade and movable relatively to each other toward and away from said blade,
   (b) a conductive cooling pad carried by each jaw and movable bodily therewith into and out of clamping engagement with the opposite sides of the blade,
   (c) a pair of electrode holders mounted on each cooling pad, movable bodily therewith and including a lower electrode holder in electric connection with the cooling pads, and an upper electrode holder in insulated relation with the lower holder,
   (d) an elongated U-shaped carbon brush type electrode carried by each pair of electrode holders and having parallel legs in electrical connection with the upper and lower electrode holders respectively, and an interconnecting bight portion designed for clamping engagement with a tooth operatively positioned on said working edge of the saw blade,
   (e) said jaws being movable between innermost positions wherein the cause the bight portions of the electrodes to engage the opposite sides of the tooth positioned on said working edge and outer positions wherein the tooth is released by said bight portions,
   (f) a pressure pin holder mounted on one of said jaws and overlying said working edge of the blade, a pressure pin mounted on said pressure pin holder for movement into and out of engagement with the segment on said working edge, releasable means yieldingly urging said pressure pin into engagement with said tooth,
   (g) means for connecting the two electrode holders of each pair in a resistance circuit, and
   (h) means for connecting the upper electrode holders and cooling pads in a welding circuit, the upper and lower electrode holders of each pair, the cooling pads, and the pressure pin holder being provided with internal cooling chambers, and means for passing a cooling liquid serially through said chambers.

7. A fixture adapted to resistance-braze an initially separate saw tooth to the working edge of a saw blade and comprising:
   (a) a pair of clamping jaws adapted to straddle the opposite sides of the blade and movable relatively each other toward and away from said blade,
   (b) a conductive cooling pad carried by each jaw and movable bodily therewith into and out of clamping engagement with the opposite sides of the blade,
   (c) means on one of said cooling pads defining a lower electrode holder in electrical contact with and in fixed relation to the cooling pad,
   (d) a lower electrode holder movably mounted on the other cooling pad, arranged in electrical contact therewith, and movable independently thereof toward and away from the blade,
   (e) an upper electrode holder fixedly mounted on each lower electrode holder in insulated relationship,
   (f) an elongated U-shaped carbon brush type electrode having its opposite ends electrically connected to and supported in the upper and lower electrode holders respectively of each pair of associated electrode holders, and having a bight portion designed for clamping engagement with a tooth positioned on said working edge,
   (g) said jaws being movable between innermost positions wherein they cause the bight portions of the electrodes to engage the opposite sides of the tooth on said working edge, and outer positions wherein the tooth is released by said bight portions,
   (h) spring means effective when said jaws are in their innermost positions for yieldingly urging said movable lower electrode holder toward said blade,
   (i) manually operable means for moving said movable lower electrode holder and its associated upper electrode holder bodily as a unit away from said blade when the jaws are in their innermost positions to release the tooth,
(j) means for connecting the two electrode holders of each pair of associated electrode holders in a resistance circuit, and
(k) means for connecting the upper electrode holders and cooling pads in a welding circuit.

8. A fixture as set forth in claim 7 and wherein the said manually operable means for moving the movable lower electrode holder comprises a rotatable cam element mounted on the said other cooling pad and engageable with said movable lower electrode holder.

9. A fixture as set forth in claim 7, wherein the upper electrode holders and the cooling pads are provided with respective internal cooling chambers and, including, means for passing a cooling liquid serially through said chambers.

10. A fixture as set forth in claim 7, wherein all of the electrode holders and both cooling pads are provided with respective internal cooling chambers and, including, means for passing a cooling liquid serially through said chambers.

11. A fixture adapted to resistance-braze an initially separate saw tooth to the working edge of a saw blade and comprising:
(a) a pair of clamping jaws adapted to straddle the opposite sides of the blade and movable relatively to each other toward and away from said blade,
(b) a conductive cooling pad carried by each jaw and movable bodily therewith into and out of clamping engagement with the opposite sides of the blade,
(c) means on one of said cooling pads defining a lower electrode holder in electrical contact with and in fixed relation to the cooling pad,
(d) a lower electrode holder movably mounted on the other cooling pad, arranged in electrical contact therewith, and movable independently thereof toward and away from the blade,
(e) an upper electrode holder fixedly mounted on each lower electrode holder in insulated relationship,
(f) an elongated U-shaped carbon brush type electrode having its opposite ends electrically connected to and supported in the upper and lower electrode holders respectively of each pair of associated electrode holders, and having a bight portion designed for clamping engagement with a tooth positioned on said working edge,
(g) said jaws being movable between innermost positions wherein they cause the bight portions of the electrodes to engage the opposite sides of the tooth on said working edge, and outer positions wherein the tooth is released by said bight portions,
(h) spring means effective when said jaws are in their innermost positions for yieldingly urging said movable lower electrode holder toward said blade,
(i) manually operable means for moving said movable lower electrode holder and its associated upper electrode holder bodily as a unit away from the blade when the jaws are in their innermost positions in order to release the tooth,
(j) a pressure pin holder mounted on one of said jaws and overlying said working edge of the blade,
(k) a pressure pin mounted on said pressure pin holder for movement into and out of engagement with the tooth on said working edge,
(l) spring means yieldingly urging said pressure pin into engagement with said tooth,
(m) manually operable means for moving said pressure pin out of engagement with said tooth against the action of said latter spring means,
(n) means for connecting the two electrode holders of each pair of holders in a resistance circuit, and
(o) means for connecting the upper electrode holders and the cooling pads in a welding circuit.

12. A fixture as set forth in claim 11 and including, additionally, releasable toggle means for positively locking said jaws in their innermost positions.

13. A fixture as set forth in claim 11 and wherein said manually operable means for moving said pressure pin out of engagement with said segment includes releasable toggle means for maintaining the pressure pin in engagement with said tooth.

14. A fixture as set forth in claim 11, wherein all of the electrode holders and the cooling pads are provided with internal cooling chambers, and, including, means for passing a cooling fluid serially through said chambers.

15. A fixture adapted to resistance-braze an initially separate saw tooth to the working edge of a saw blade and comprising:
(a) a fixed clamping saw,
(b) supporting means for loosely supporting said fixed jaw upon said saw blade,
(c) a movable clamping jaw movable toward and away from the fixed jaw between open-jaw and closed-jaw positions,
(d) a cooling pad carried by each clamping jaw and engageable with the opposite sides of the saw blade when the movable jaw is in its closed-jaw position,
(e) manually operable means for clamping the movable clamping jaw in its closed-jaw position,
(f) a pair of electrode holders mounted on each cooling pad, movable bodily therewith and including a lower electrode holder in electric connection with the associated cooling pad and an upper electrode holder in insulated relation with the lower electrode holder,
(g) an elongated U-shaped carbon brush type electrode carried by each pair of electrode holders and having parallel legs in electrical connection with the upper and lower electrode holders respectively, and in interconnecting bight portion designed for clamping engagement with a tooth operatively positioned on said working edge when the movable jaw is in its closed-jaw position,
(h) means for connecting the two electrode holders of each pair in a resistance circuit, and
(i) means for connecting the upper electrode holders and cooling pads in a welding circuit.

16. A fixture for resistance-brazing an initially separate saw tooth segment to the working edge of a saw blade as set forth in claim 15 and wherein the means for loosely supporting the fixed jaw upon the saw blade comprises a hook portion on the fixed jaw and adapted to hook over said working edge of the blade whereby the fixture may be manually slid along the working edge of the saw blade when said movable jaw is in its open-jaw position.

17. A fixture adapted to resistance-braze an initially separate saw tooth to the working edge of a saw blade and comprising:
(a) a supporting cradle having a hook portion adapted to hook over said working edge,
(b) a fixed cooling pad supported by said cradle and adapted to bear against one side of the saw blade when said cradle is in position on the saw blade,
(c) a fixed lower electrode holder on said cooling pad,
(d) a fixed upper electrode holder on said lower electrode holder in dielectric relation thereto,
(e) a fixed clamping jaw secured to said cradle and projecting upwardly above the blade when said cradle is in position on the saw blade,
(f) a movable clamping jaw pivoted to the fixed clamping jaw for swinging movement toward and away therefrom, and disposed on the other side of the blade when the cradle is in position on the latter,
(g) a movable cooling pad secured to said movable clamping jaw and movable bodily therewith into and out of engagement with the blade, a movable lower electrode holder on said movable cooling pad,
(h) a movable upper electrode holder mounted on said movable lower electrode in insulated relation thereto,
(i) movable and fixed elongated U-shaped carbon brush type electrodes carried by the movable and the fixed lower electrodes respectively and having parallel legs in electrical connection with the upper and lower electrode holders, and interconnecting bight portions designed for clamping engagement with the opposite sides of a tooth operatively positioned on said working edge of the blade,
(j) means for connecting the upper and lower fixed electrode holders in a resistance circuit, means for connecting the upper and lower movable electrode holders in a parallel resistance circuit, and
(k) means for connecting the upper electrode holders and the cooling pads in a welding circuit.

18. A fixture adapted to resistance-braze an initially separate saw tooth to the working edge of a saw blade and comprising:
  (a) a pair of clamping jaws adapted to straddle the opposite sides of the blade and movable relatively to each other toward and away from said blade,
  (b) a conductive cooling pad carried by each jaw and movable bodily therewith into and out of clamping engagement with the opposite sides of the blade,
  (c) a pair of electrode holders mounted on each cooling pad, movable bodily therewith and including a lower electrode holder in electric connection with the cooling pad, and an upper electrode holder in insulated relation with the lower holder,
  (d) an elongated U-shaped carbon brush type electrode carried by each pair of electrode holders and having parallel legs in electrical connection with the upper and lower electrode holders respectively, and an interconnecting bight portion designed for clamping engagement with a tooth operatively positioned on said working edge of the saw blade,
  (e) said jaws being movable between innermost positions wherein they cause the bight portions of the electrodes to engage the opposite sides of the tooth positioned on said working edge and outer positions wherein the tooth is released by said bight portions.
  (f) the upper and lower electrode holders of each pair and the cooling pads being provided with respective internal cooling chambers,
  (g) each chamber being provided with a liquid inlet and a liquid outlet,
  (h) a pair of combined liquid manifolds and electrical terminal blocks formed of a conductive metal,
  (i) one of said blocks being provided with a liquid supply chamber therein and the other block being provided with a return chamber therein,
  (j) said supply and return chambers each being provided with a liquid inlet and liquid outlet,
  (k) conductors electrically connecting one of said blocks to the upper electrode holders,
  (l) conductors electrically connecting the other block to said cooling pads,
  (m) liquid conduits connecting said fluid outlet and fluid inlets and establishing a closed hydraulic series circuit extending through all of said chambers,
  (n) a flexible conductor electrically connecting each of said blocks to a source of welding current, and
  (o) a flexible tubular liquid conduit surrounding each of said two latter conductors and connecting the chambers of the terminal blocks to a source of cooling liquid.

References Cited

UNITED STATES PATENTS

| | | | |
|---|---|---|---|
| 1,613,957 | 1/1927 | Madden | 219—85 X |
| 2,139,499 | 12/1938 | Howie | 219—85 X |
| 2,876,332 | 3/1959 | Dussart | 219—85 |
| 2,885,530 | 5/1959 | McLean Bell | 219—85 |
| 3,099,738 | 7/1963 | Sadowski | 219—85 |

RICHARD M. WOOD, *Primary Examiner.*

ANTHONY BARTIS, *Examiner.*

B. A. STEIN, *Assistant Examiner.*